United States Patent
Shibata et al.

(10) Patent No.: US 7,282,808 B2
(45) Date of Patent: Oct. 16, 2007

(54) POWER GENERATING WIND TURBINE

(75) Inventors: Masaaki Shibata, Nagasaki (JP); Hisao Miyake, Nagasaki (JP); Tomohiro Numajiri, Nagasaki (JP); Yasuyoshi Tozaki, Nagasaki (JP); Katsuhiko Shoda, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/568,627

(22) PCT Filed: Sep. 28, 2004

(86) PCT No.: PCT/JP2004/014157

§ 371 (c)(1),
(2), (4) Date: Feb. 16, 2006

(87) PCT Pub. No.: WO2005/033505

PCT Pub. Date: Apr. 14, 2005

(65) Prior Publication Data

US 2006/0220389 A1    Oct. 5, 2006

(30) Foreign Application Priority Data

Sep. 30, 2003   (JP) .............................. 2003-339304

(51) Int. Cl.
*F03D 9/00*   (2006.01)
*H02P 9/04*   (2006.01)

(52) U.S. Cl. ......................................... 290/55; 290/44

(58) Field of Classification Search .................. 290/55, 290/44; 415/7, 2.1, 4.2, 4.3, 4.5, 907, 908, 415/905; 384/559, 455; 475/348
See application file for complete search history.

(56) References Cited

U.S. PATENT DOCUMENTS

| 3,652,141 A * | 3/1972 | Husten et al. ............... 384/455 |
| 4,085,984 A * | 4/1978 | Cameron ..................... 384/563 |
| 4,427,897 A * | 1/1984 | Migliori ....................... 290/44 |
| 4,613,763 A * | 9/1986 | Swansen ....................... 290/44 |
| 4,895,458 A | 1/1990 | Gerster |
| 4,989,999 A * | 2/1991 | Siemensmeyer ............. 384/455 |
| 5,975,762 A * | 11/1999 | Ai ................................ 384/450 |
| 6,293,704 B1 * | 9/2001 | Gradu ......................... 384/557 |

(Continued)

FOREIGN PATENT DOCUMENTS

DE   WO 03/031811 A2 *  4/2006

(Continued)

*Primary Examiner*—Julio Gonzalez
(74) *Attorney, Agent, or Firm*—Wenderoth, Lind & Ponack, L.L.P.

(57) ABSTRACT

A power generating wind turbine includes parts and components installed in or on a nacelle which are made smaller and lighter, thus facilitating maintenance. A main shaft 11, a gear-box for speeding up rotation of the main shaft 11 and a generator 13 driven by an output of the gear-box 11 are provided on a nacelle bed plate 6. The main shaft 11 is connected to an input shaft 12a end of the gear-box 12 via a double-row tapered roller bearing 16. The main shaft 11 is supported to a wall portion W1 of the nacelle bed plate 6 with the double-row tapered roller bearing 16 being interposed therebetween. The main shaft 11 is formed in an annular shape having its outer diameter D1 larger than its axial directional length L1.

8 Claims, 12 Drawing Sheets

U.S. PATENT DOCUMENTS

| | | |
|---|---|---|
| 6,420,808 B1 | 7/2002 | Hosle |
| 6,543,938 B2 * | 4/2003 | Dittenhofer ................ 384/455 |
| 6,866,423 B2 * | 3/2005 | Faltus et al. ................ 384/559 |
| 2002/0049108 A1 | 4/2002 | Hosle |
| 2003/0086631 A1 | 5/2003 | Faltus et al. |
| 2003/0194310 A1 | 10/2003 | Canini et al. |
| 2004/0038770 A1 | 2/2004 | Flamang et al. |
| 2004/0108733 A1 | 6/2004 | Wobben |
| 2004/0232704 A1 * | 11/2004 | Casazza et al. ............... 290/55 |
| 2006/0071575 A1 * | 4/2006 | Jansen et al. ............... 310/266 |

FOREIGN PATENT DOCUMENTS

| | | |
|---|---|---|
| DE | WO 02/057624 A1 * | 7/2006 |
| EP | 0 811 764 A1 | 12/1997 |
| EP | 1 186 804 A1 | 3/2002 |
| EP | 1 243 791 A2 | 9/2002 |
| JP | 1-113579 | 5/1989 |
| JP | 6-213230 | 8/1994 |
| JP | 2000-337245 | 12/2000 |
| JP | 2002-129217 | 5/2002 |
| JP | 2003-194071 | 7/2003 |
| WO | 96/11338 | 4/1996 |
| WO | 01/21956 | 3/2001 |
| WO | 01/57398 | 8/2001 |
| WO | 01/98655 | 12/2001 |
| WO | 02/14690 | 2/2002 |
| WO | 02/057624 | 7/2002 |
| WO | 02/079644 | 10/2002 |
| WO | 03/014566 | 2/2003 |
| WO | 03/014567 | 2/2003 |
| WO | 03/031811 | 4/2003 |

* cited by examiner

POWER GENERATING WIND TURBINE

TECHNICAL FIELD

The present invention relates to a power generating wind turbine.

BACKGROUND ART

A power generating wind turbine comprises a nacelle installed on a tower, a wind turbine rotating blade, a gear-box inputted with a wind force received by the wind turbine rotating blade via a main shaft and a generator driven by an output of the gear-box. Such power generating wind turbine is known, for example, by Patent Documents 1 to 3 as mentioned below.

In the Patent Document 1, for example, a power generating wind turbine is disclosed having a structure in which a rotor provided with a wind turbine rotating blade is directly installed on a planetary carrier of a gear-box to be supported to the gear-box.

Also, in the Patent Document 2, a power generating wind turbine is disclosed having a structure in which a rotor hub is directly installed on a planetary holder to be supported to a gear-box.

Further, in the Patent Document 3, a power generating wind turbine is disclosed having a structure in which a rotor is assembled into a gear-box to be supported to the gear-box. An annular gear carrier and an annular gear of the gear-box are directly fitted to this rotor so that the rotor itself constitutes a portion of the gear-box.

Patent Document 1: European laid-open patent application No. 0811764 (3rd Column and FIG. 1)
Patent Document 2: World laid-open patent application No. 02/079644 (4th Column and FIG. 2)
Patent Document 3: US laid-open patent application No. 2002/0049108 (Abstract and Figures)

In the prior art power generating wind turbines, however, there are shortcomings as follows: That is, the construction is made such that the wind turbine rotating blade and the rotor are supported to the gear-box and hence the gear-box and the gear-box supporting members are required to have a sufficient strength to withstand a load added to the rotor, such as a radial load, thrust load and bending load.

The size of the gear-box is decided depending not only on its speed-up ratio but also on its required strength. That is, even if a speed-up ratio is the same, a gear-box for which a higher strength is required is inevitably made larger to that extent. For this reason, the power generating wind turbines disclosed in the Patent Documents 1 to 3 need to be provided with a large size gear-box.

Such a large size gear-box has a heavy weight and hence the load adding to the gear-box, nacelle and tower supporting the nacelle also becomes large. Thus, these parts and components are required to have a higher strength, and this results in these parts and components having a large size and heavy weight.

In the prior art power generating wind turbine, therefore, there are problems not only in the manufacturing cost but also in the transportation and installation work of each of the constructional parts and components, such as the gear-box, nacelle, tower or the like.

Moreover, by using such a large size gear-box, a space in the nacelle becomes narrower and the freedom of structure of the nacelle and the freedom of arrangement of the parts and components installed in the nacelle become smaller so that the design becomes difficult.

Also, in such construction of the rotor being supported to the gear-box, if the gear-box is to be overhauled for maintenance, the rotor must be once taken out of the gear-box and placed on the ground. Thus, the maintenance work becomes very troublesome.

SUMMARY OF THE INVENTION

In view of the problems in the prior art, it is an object of the present invention to provide a power generating wind turbine in which parts and components provided in the nacelle can be made compact in size and light in weight and the maintenance can be facilitated.

In order to achieve the above-mentioned object, a power generating wind turbine of the present invention is constructed by the means as follows:

That is, in a first aspect of the invention, a power generating wind turbine comprising a nacelle installed on a tower, the nacelle comprising therein or thereon a main shaft to which a wind turbine rotating blade is fitted, a gear-box by which a rotation of the main shaft is speeded up to be put out and a generator driven by an output of the gear-box, is characterized in that the main shaft is connected to an end of an input shaft of the gear-box and is supported to the nacelle via a single double-row tapered roller bearing.

In the power generating wind turbine of the present invention, the main shaft is supported by the single double-row tapered roller bearing that is provided in the nacelle. The double-row tapered roller bearing is provided in a single unit and thereby the radial load, thrust load and bending load adding to the supporting shafts can be received. That is, all the radial load, thrust load and bending load adding to the main shaft are received by this single double-row tapered roller bearing.

In this way, in the power generating wind turbine of the present invention, the main shaft is supported by the single double-row tapered roller bearing and thereby the supporting structure of the main shaft can be made compact.

Also, the radial load, thrust load and bending load adding to the main shaft are received by the double-row tapered roller bearing and thereby the strength required of the gear-box can be made smaller.

The size of the gear-box is decided depending not only on its speed-up ratio but also on its strength required. In the power generating wind turbine of the present invention, the strength so required of the gear-box can be made smaller and hence, as the gear-box, such one as is smaller in size and lighter in weight can be used as compared with that used in the prior art power generating wind turbine.

Also, the main shaft is connected to the input shaft of the gear-box so as to be separable from each other. Hence, in case of maintenance of the gear-box, the gear-box and the main shaft are separated from each other and maintenance of the gear-box only can be carried out. Likewise, in case of maintenance of the main shaft, the main shaft and the gear-box are separated from each other and maintenance of the main shaft only can be carried out.

Also, in a second aspect of the invention, a power generating wind turbine comprising a nacelle installed on a tower, the nacelle comprising therein or thereon a main shaft to which a wind turbine rotating blade is fitted, a gear-box by which a rotation of the main shaft is speeded up to be put out and a generator driven by an output of the gear-box, is characterized in that the main shaft is connected to an end of an input shaft of the gear-box and is supported to the nacelle via a single three-row roller bearing comprising a row of rollers receiving a radial load and a pair of rows of rollers receiving a thrust load.

In the power generating wind turbine of the present invention, the main shaft is supported by the single three-row roller bearing that comprises a row of rollers receiving the radial load and a pair of rows of rollers receiving the thrust load. Thereby, the supporting structure of the main shaft can be made compact.

Also, the radial load, thrust load and bending load adding to the main shaft are received by each of the rows of the roller bearing and thereby the strength required of the gear-box and the gear-box supporting members can be made smaller.

The size of the gear-box is decided depending not only on its speed-up ratio but also on its strength required. In the power generating wind turbine of the present invention, the strength so required of the gear-box can be made smaller and hence, as the gear-box, such one as is smaller in size and lighter in weight can be used as compared with that used in the prior art power generating wind turbine.

Also, the main shaft is connected to the input shaft of the gear-box so as to be separable from each other. Hence, in case of maintenance of the gear-box, the gear-box and the main shaft are separated from each other and maintenance of the gear-box only can be carried out. Likewise, in case of maintenance of the main shaft, the main shaft and the gear-box are separated from each other and maintenance of the main shaft only can be carried out.

In a third aspect of the invention, a power generating wind turbine as mentioned in the first or second aspects is characterized in that the main shaft is formed in an annular shape or a disk shape having its outer diameter made larger than its axial directional length.

In the power generating wind turbine constructed as mentioned above, the outer diameter of the main shaft is set larger as compared with the axial directional length of the main shaft, that is, the ratio of the outer diameter to the axial directional length is set larger. That is, the axial directional length is contracted as compared with the prior art main shaft. Nevertheless, in the main shaft, a space sufficient for installing the double-row tapered roller bearing or the three-row roller bearing is secured.

Thereby, the axial directional length of the main shaft is suppressed and the weight of the main shaft can be reduced.

Also, the bending moment adding to the main shaft when the wind turbine rotating blade receives the wind force becomes less and the strength required of the main shaft and the main shaft supporting members can be made smaller. By so making smaller the strength required of the main shaft and the main shaft supporting members, the main shaft and the main shaft supporting members can also be made smaller.

In a fourth aspect of the invention, a power generating wind turbine as mentioned in the first or second aspects is characterized in that the main shaft and the input shaft of the gear-box are connected to each other via a coupling. Also, in a fifth aspect of the invention, a power generating wind turbine as mentioned in the third aspect is characterized in that the main shaft and the input shaft of the gear-box are connected each other via a coupling.

In the power generating wind turbine constructed as mentioned above, the main shaft and the input shaft of the gear-box are connected to each other via the coupling and hence an adjusting work requiring skills, such as an alignment adjustment of the main shaft and the input shaft or the like, becomes unnecessary and the assembling and maintenance thereof are facilitated.

By the coupling also, transmission of the radial load, thrust load and bending load from the main shaft to the gear-box is prevented and the strength required of the gear-box can be made further smaller.

Hence, as the coupling of the present invention, a gear coupling, disk coupling, connecting structure by a bush, connecting structure by a pin or otherwise a coupling of an arbitrary type can be used.

As a summary, in the power generating wind turbine according to the present invention, the parts and components, such as the supporting structure of the main shaft, the gear-box or the like, that are installed in or on the nacelle can be made smaller in size and lighter in weight and hence the nacelle can be made smaller and lighter. Also, by so making the nacelle and the parts and components installed in or on the nacelle smaller and lighter, the transportation and installation work of the nacelle and other parts and components can be facilitated. Also, the load adding to the tower that supports these parts and components becomes less and the structure of the tower can be simplified.

Further, the main shaft and the gear-box are structurally made separable from each other and thereby maintenance of these components can be carried out independent of each other and the maintainability is enhanced.

DETAILED DESCRIPTION OF PREFERRED EMBODIMENTS

Herebelow, the present invention will be described more in detail based on embodiments according to the present invention with reference to the appended drawings.

First Embodiment

A first embodiment according to the present invention will be described with reference to FIGS. 1 to 3.

Figure 1:
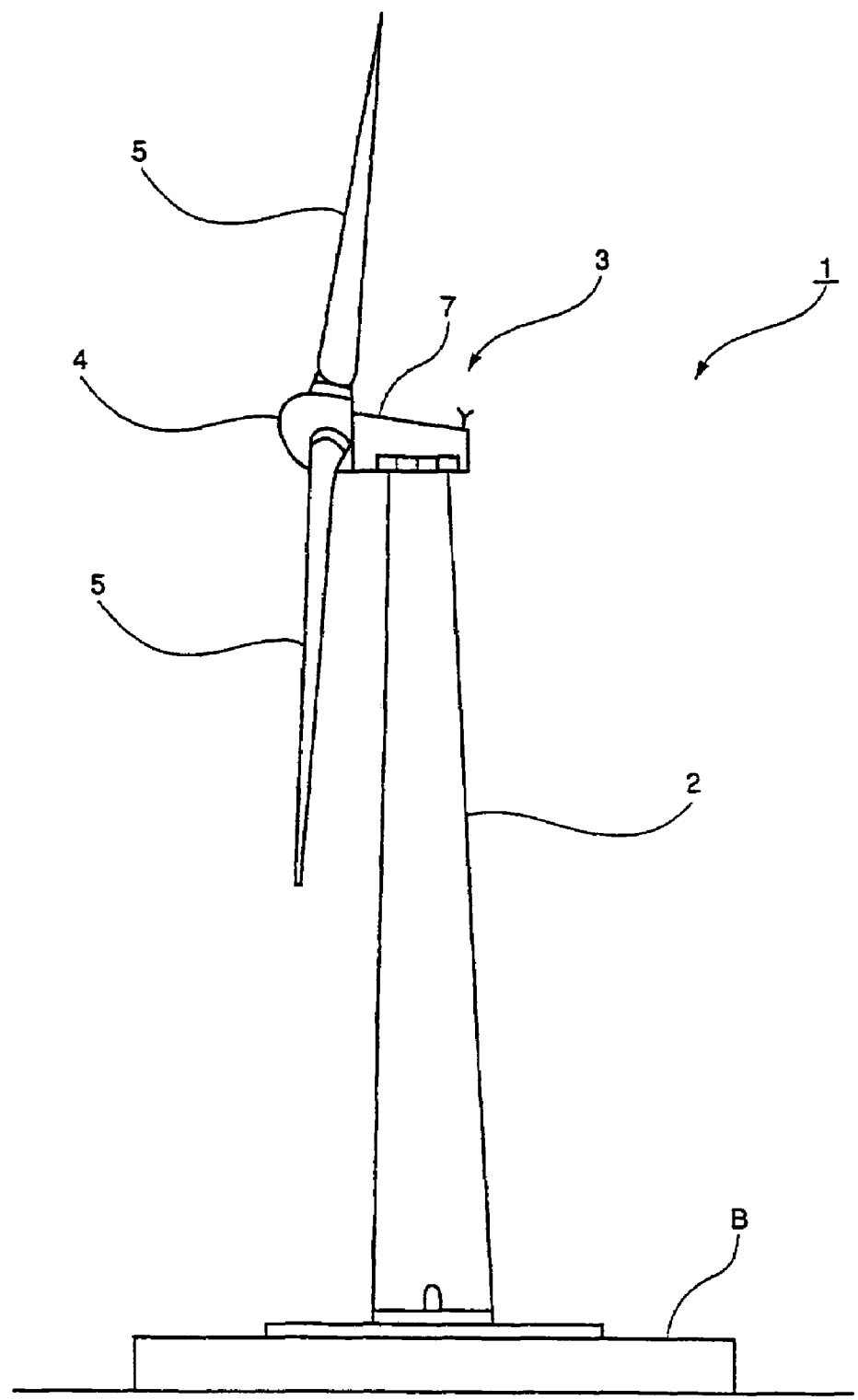
FIG. 1 is a side view of a power generating wind turbine of a first embodiment according to the present invention.

A power generating wind turbine 1 of the present embodiment, as shown in FIG. 1, comprises a tower 2 provided to rise on a base B, a nacelle 3 provided on an upper end of the tower 2 and a rotor head 4 provided onto the nacelle 3 so as to be rotatable around a substantially horizontal axis. A plurality of wind turbine rotating blades 5, arranged radially around a rotational axis of the rotor head 4, are fitted to the rotor head 4, so that a wind force working on the wind turbine rotating blades 5 from a rotating axis direction of the rotor head 4 is converted into power to rotate the rotor head 4 around the rotational axis thereof.

The tower 2 is constructed, for example, by a plurality of tower components being vertically piled one on another. The nacelle 3 is installed on the uppermost one of the tower components constituting the tower 2. The nacelle 3 comprises a nacelle bed plate 6 (FIG. 2) fitted to the upper end of the tower 2 and a cover 7 (FIG. 1) covering the nacelle bed plate 6 from above.

The nacelle bed plate 6 is provided to be rotatable on a horizontal plane relative to the tower 2 so that, when the nacelle bed plate 6 is driven by a drive unit (not shown), the nacelle 3 can change its direction on the horizontal plane.

Figure 2:
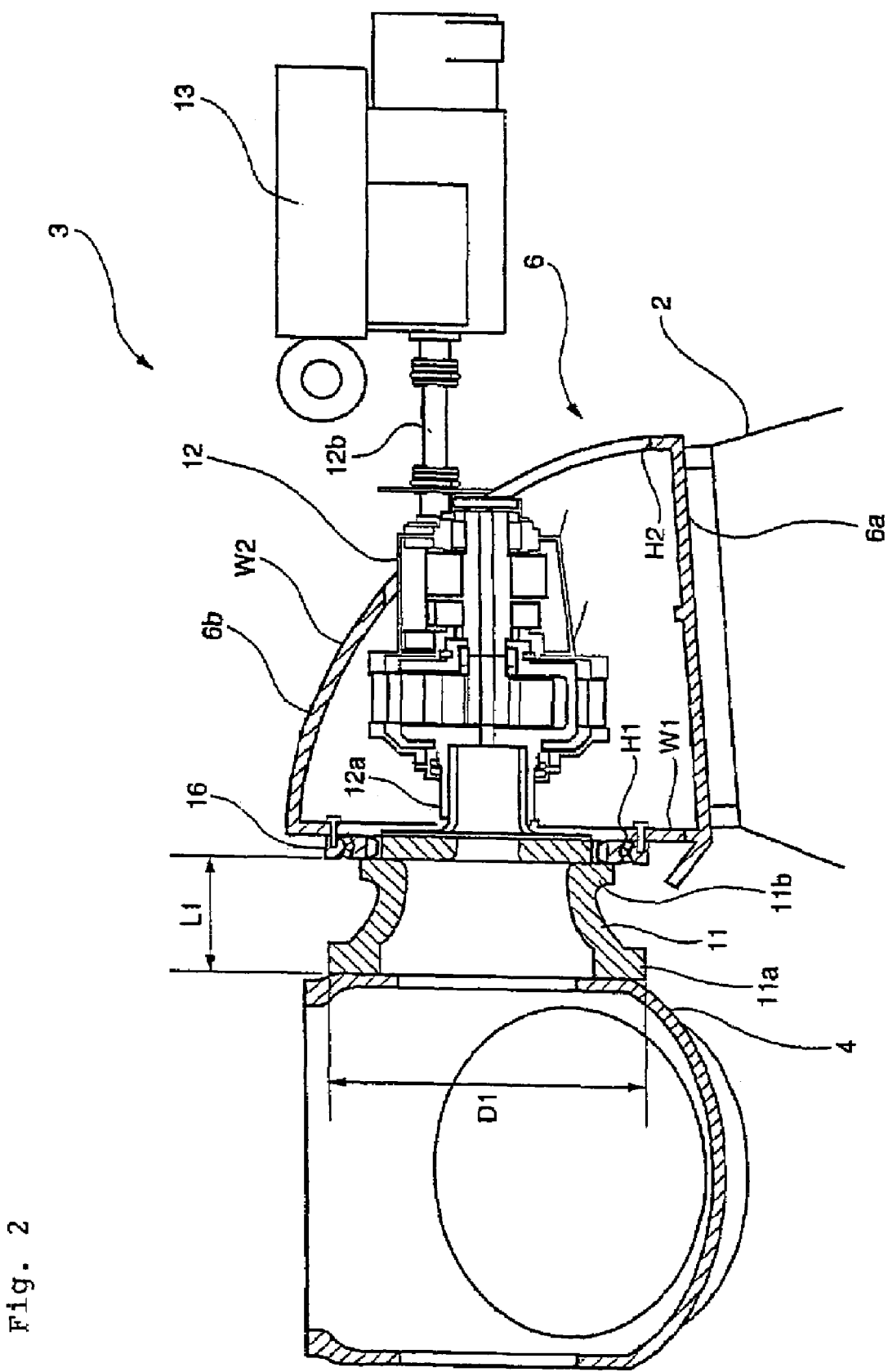
FIG. 2 is a cross sectional side view showing a construction of a nacelle of the power generating wind turbine of the first embodiment of FIG. 1.

The nacelle bed plate 6, as shown in FIG. 2, comprises a floor portion 6a to be fitted substantially horizontally to the upper end of the tower 2 and a shell body 6b covering the floor portion 6a from above. The shell body 6b comprises a wall portion W1 rising from a connecting portion between the shell body 6b and the floor portion 6a and a dome portion W2 connecting together a peripheral edge portion of the wall portion W1 and the floor portion 6a.

Also, a first opening portion H1 is formed in the wall portion W1 and a second opening portion H2 is provided in the dome portion W2 at a position opposed to the first opening portion H1. Through these first and second opening portions H1, H2, the parts and components to be provided inside or outside of the nacelle bed plate 6 are assembled to be connected to each other.

As shown in FIG. 2, the nacelle bed plate 6 is provided with a main shaft 11, a gear-box 12 speeding up a rotation of the main shaft 11 to be put out and a generator 13 driven by an output of the gear-box 12.

The gear-box 12 is provided in the nacelle bed plate 6 and the generator 13 is arranged outside of the nacelle bed plate 6 at a position opposed to the second opening portion H2 of the dome portion W2. The gear-box 12 and the generator 13 are fixed to the nacelle bed plate 6 via a stay or the like (not shown).

An input shaft 12a is connected to the gear-box 12 through the first opening portion H1 so that a rotation of the input shaft 12a around the axis relative to the main shaft 11 is regulated. Thereby, the rotation inputted into the input shaft 12a from the main shaft 11 is speeded up so as to meet a rotational speed appropriate for the generator 13 and is put out to an output shaft 12b.

The gear-box 12 of the present embodiment carries out a speed-up of one stage or plural stages and, for example, between the input shaft 12a and the output shaft 12b, a planetary stage using planetary gears and a parallel stage using spur gears are provided in series in one stage or plural stages, respectively. By these respective planetary stage and parallel stage, the rotation inputted into the input shaft 12a is speeded up to be finally put out to the output shaft 12b with an appropriate rotational speed.

Also, a generator shaft (not shown) of the generator 13 is connected to the output shaft 12b of the gear-box 12 through the second opening portion H2 so that a rotation of the generator shaft around the axis relative to the output shaft 12b of the gear-box 12 is regulated. Thus, by the rotation of the output shaft 12b, the generator 13 is driven so that electricity is generated.

As the generator 13, an arbitrary type of generator, such as an induction type, wound type, secondary resistance control wound induction type (rotor current control or RCC type), secondary excitation control wound induction type (static Scherbius or D.F. type), synchronous type, permanent magnet type, induction multiple type, etc. can be used.

The main shaft 11 is arranged outside of the nacelle bed plate 6 at a position opposed to the first opening portion H1 of the wall portion W1. The main shaft 11 is provided having its one end in the axial direction directed to the first opening portion H1. A double-row tapered roller bearing 16 is interposed between the main shaft 11 and the wall portion W1 and the main shaft 11 is connected to a distal end of the input shaft 12a of the gear-box 12 via the double-row tapered roller bearing 16.

Also, the main shaft 11 has the other end in the axial direction connected to the rotor head 4 so that a rotation of the rotor head 4 around the rotational axis relative to the main shaft 11 is regulated. Thereby, the rotor head 4 and the main shaft 11 integrally rotate around the axis.

The double-row tapered roller bearing 16 is provided coaxially with the main shaft 11 between the one end in the axial direction of the main shaft 11 and the wall portion W1 so as to support the main shaft 11 rotatably around the axis of the main shaft 11. That is, the main shaft 11 is supported to the wall portion W1 via the double-row tapered roller bearing 16.

Also, a coupling 17 (FIG. 3) is provided between the double-row tapered roller bearing 16 and the input shaft 12a of the gear-box 12. That is, the main shaft 11 is connected to the input shaft 12a via the double-row tapered roller bearing 16 and the coupling 17. In the present embodiment, the coupling 17 is a gear coupling.

Next, a structure of the main shaft 11, supporting structure of the main shaft 11 and connecting structure of the main shaft 11 and the gear-box 12 will be described in detail with reference to FIGS. 1 to 3.

As shown in FIG. 2, the main shaft 11 is formed having a minor axis. Concretely, the main shaft 11 is formed in an approximately annular shape having its outer diameter D1 made larger than its axial directional length L1 (this may also be of an approximately disk shape). The main shaft 11 has its one end in the axial direction to which the rotor head 4 is fitted provided with a first flange 11a. To this first flange 11a, the rotor head 4 is fitted by bolting or the like.

Also, the main shaft 11 has the other end in the axial direction provided with a second flange 11b. To this second flange 11b, the double-row tapered roller bearing 16 is connected by bolting or the like.

Figure 3:
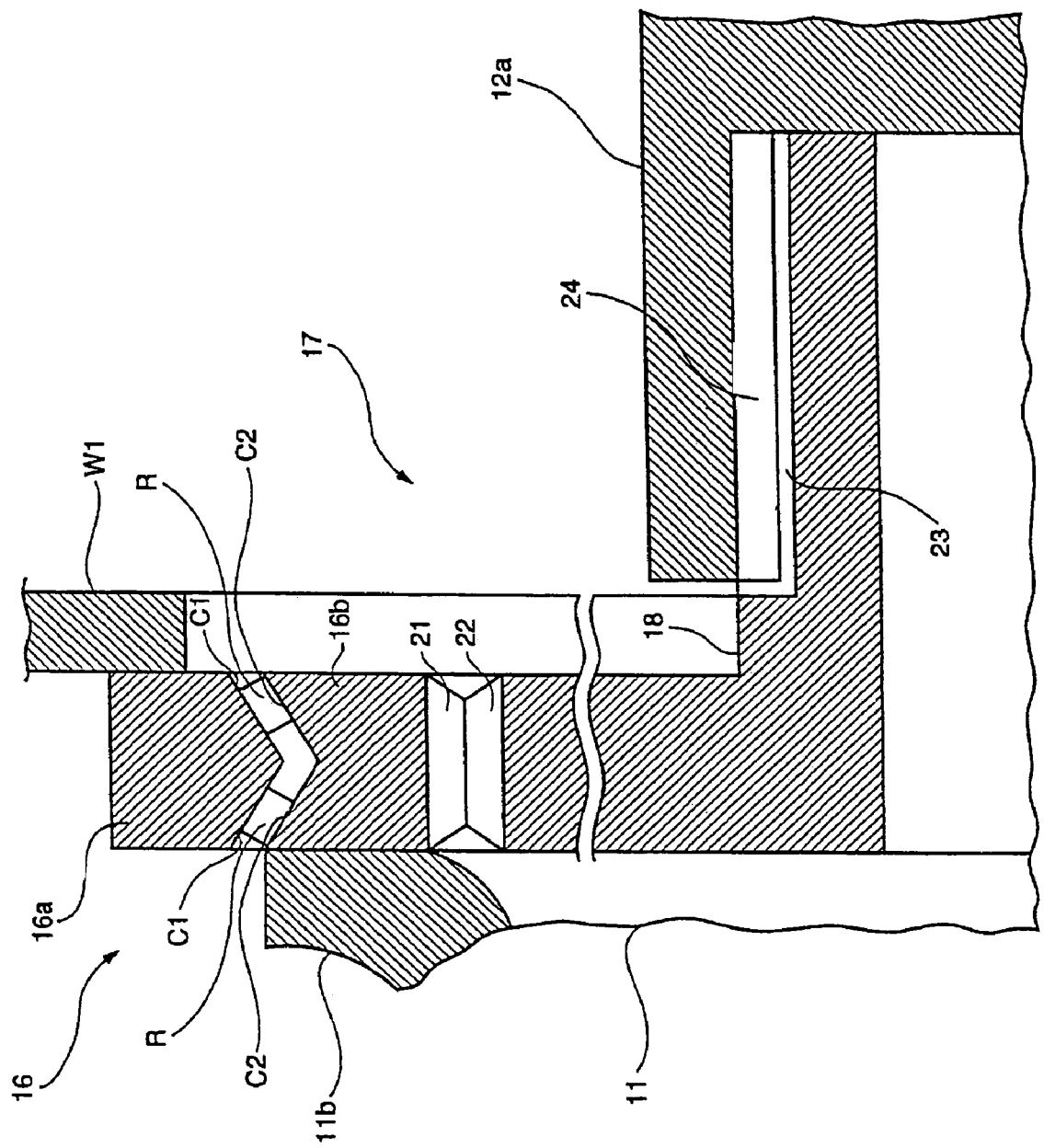
FIG. 3 is an enlarged view of a portion of FIG. 2.

As shown in FIGS. 2 and 3, the double-row tapered roller bearing 16 comprises an outer ring 16a connected to the wall portion W1 by bolting or the like, and an inner ring 16b provided coaxially on the radial directional inner side of the outer ring 16a. The main shaft 11 is connected to the inner ring 16b by bolting or the like.

In FIG. 3, between the outer ring 16a and the inner ring 16b, a plurality of rolling elements are provided along the circumferential direction. As the rolling elements, tapered rollers (conical rollers) R are used.

Hereinbelow, with respect to the double-row tapered roller bearing 16, the tapered rollers R arranged along the circumferential direction at the same position in the axial direction will be referred to as a row of the tapered rollers R. This row of the tapered rollers R is provided in plural rows along the axial direction (in the present embodiment, the row of the tapered rollers R is provided in two rows).

As further details of the construction of the double-row tapered roller bearing 16, in an inner circumferential surface of the outer ring 16a, an outer ring inclined surface C1, having its surface plane inclined relative to the axis, is provided along the entire circumferential direction. This outer ring inclined surface C1 is provided at two places along the axial direction and each of the outer ring inclined surfaces C1 has its inclination direction relative to the axis reversed to each other.

In the present embodiment, the outer ring inclined surface C1 on the main shaft 11 side has its one end on the main shaft 11 side positioned on the radial directional outer side and the other end on the gear-box 12 side positioned on the radial directional inner side. Also, the outer ring inclined surface C1 on the gear-box 12 side has its one end on the main shaft 11 side positioned on the radial directional inner side and the other end on the gear-box 12 side positioned on the radial directional outer side. That is, the inner circumferential surface of the outer ring 16a, when seen on a cross section taken on the axis, is of a mountain shape.

Also, an inner ring inclined surface C2 is provided in an outer circumferential surface of the inner ring 16b, at a position opposed to each of the outer ring inclined surfaces C1. The inclination direction of each of the inner ring inclined surfaces C2 is the same as the inclination direction of the opposed outer ring inclined surface C1 and the inclination angle of each of the inner ring inclined surfaces C2 relative to the axis is set slightly smaller than the inclination angle of the opposed outer ring inclined surface C1.

In the present embodiment, the inner ring inclined surface C2 on the main shaft 11 side has its one end on the main shaft 11 side positioned on the radial directional outer side and the other end on the gear-box 12 side positioned on the radial directional inner side. Also, the inner ring inclined surface C2 on the gear-box 12 side has its one end on the main shaft 11 side positioned on the radial directional inner side and the other end on the gear-box 12 side positioned on the radial directional outer side. That is, the outer circumferential surface of the inner ring 16b, when seen on a cross section taken on the axis, is of a valley shape.

The tapered rollers R are provided along the circumferential direction between the outer ring inclined surface C1 and the inner ring inclined surface C2 of each pair and the row of the tapered rollers R is arranged in two rows, one provided on the main shaft 11 side and one on the gear-box 12 side.

The tapered rollers R of each row are provided having their axes inclined in the same direction as the mutually opposed outer ring inclined surface C1 and inner ring inclined surface C2 relative to the axis of the double-row tapered roller bearing 16.

More concretely, the tapered rollers R of each row have their smaller diameter side positioned on the radial directional inner side and their larger diameter side positioned on the radial directional outer side. Thus, in the row of the tapered rollers R on the main shaft 11 side, the tapered rollers R are provided having their larger diameter side directed to the main shaft 11 side and their smaller diameter side directed to the gear-box 12 side. Also, in the row of the tapered rollers R on the gear-box 12 side, the tapered rollers R have their larger diameter side directed to the gear-box 12 side and their smaller diameter side directed to the main shaft 11 side.

The coupling 17, as shown in FIGS. 2 and 3, is constructed by the inner ring 16b of the double-row tapered roller bearing 16, an inner tube 18 and the input shaft 12a. The inner tube 18 is of an approximately cylindrical shape and is interposed substantially coaxially with the input shaft 12a between the double-row tapered roller bearing 16 and the input shaft 12a. The distal end portion of the input shaft 12a is formed in a cylindrical shape so that one end of the inner tube 18 in the axial direction can be inserted thereinto. If the gear-box 12 is moved toward the generator 13 side, the inner tube 18 is drawn out of the input shaft 12a so that the engagement of the input shaft 12a with the inner tube 18 is released.

As shown in FIG. 3, a first internal gear 21 is provided on an inner circumferential surface of the inner ring 16b. Also, a first external gear 22 is provided in an area of the inner tube 18 opposed to the inner circumferential surface of the inner ring 16b, such that the first external gear 22 meshes with the first internal gear 21.

In an area of the inner tube 18 inserted into the input shaft 12a, a second external gear 23 is provided and, on an inner surface of the distal end portion of the input shaft 11, a second internal gear 24, that meshes with the second external gear 23, is provided.

The second internal gear 24 is made having a diameter smaller than the first internal gear 21 and thereby a torque transmission is carried out between the inner ring 16b and the input shaft 12a.

Next, a function of the power generating wind turbine 1 constructed as mentioned above will be described.

In the power generating wind turbine 1, the wind force working on the wind turbine rotating blades 5 from the rotational axis direction of the rotor head 4 is converted into power to rotate the rotor head 4 around the rotational axis thereof.

The rotation of the rotor head 4 is transmitted to the main shaft 11 to be further transmitted from the main shaft 11 to the input shaft 12a via the inner ring 16b of the double-row tapered roller bearing 16 and the inner tube 18 of the coupling 17. Then, this rotation is speeded up by the gear-box 12 to be inputted into the generator 13 via the output shaft 12b so that electric power is generated by the generator 13.

Here, at least while the electric power is being generated, in order to effectively make use of the wind force working on the wind turbine rotating blades 5, the nacelle 3 is appropriately rotated on a horizontal plane to be directed to the windward.

When the wind so hits on the wind turbine rotating blades 5, the main shaft 11 receives not only a rotational torque but also a radial load, thrust load and bending load.

Nevertheless, in the power generating wind turbine 1 of the present embodiment, such loads adding to the main shaft 11 are received by the double-row tapered roller bearing 16 that supports the main shaft 11 and little load except the rotational torque is transmitted to the input shaft 12a of the gear-box.

Next, a function of the double-row tapered roller bearing 16 will be concretely described.

In the double-row tapered roller bearing 6, on the radial directional outer side of the inner ring 16b, the rows of the tapered rollers R are provided. The outer ring 16a is provided on the further radial directional outer side of the tapered rollers R, and this outer ring 16a is supported to the wall portion W1 of the nacelle bed plate 6.

That is, as the radial directional support of the inner ring 16b is carried out by the wall portion W1, even if the radial load adds to the main shaft 11, displacement of the main shaft 11 in the radial direction can be suppressed to the minimum. In this way, even if the radial load adds to the main shaft 11, this radial load is received by the double-row tapered roller bearing 16 and little radial load is transmitted to the input shaft 12a of the gear-box 12.

Also, in the double-row tapered roller bearing 16, the row of the tapered rollers R is provided in two rows. That is, as the inner ring 16b is supported at two places along the axial direction, even if the bending load adds to the main shaft 11, the inclination of the main shaft 11 can be suppressed to the minimum. In this way, even if the bending load adds to the main shaft 11, this bending load is received by the double-row tapered roller bearing 16 and little bending load is transmitted to the input shaft 12a of the gear-box 12.

On the other hand, in the double-row tapered roller bearing 16, on the inner circumferential surface of the outer ring 16a, the outer ring inclined surface C1, being inclined relative to the axis, is provided in two places along the axial direction and, on the outer circumferential surface of the inner ring 16b, the inner ring inclined surface C2 is provided being opposed to each of the outer ring inclined surfaces C1.

One pair of these outer ring inclined surface C1 and inner ring inclined surface C2 has its inclination direction relative to the axis reversed to the inclination direction of the other pair.

Thus, if the thrust load adds to the main shaft 11, whichever direction in the axial direction is the direction to which the thrust load adds, the inner ring inclined surface C2 is supported to the outer ring inclined surface C1 via the tapered rollers R in either one of the two pairs of the outer ring inclined surface C1 and the inner ring inclined surface C2.

That is, the inner ring 16b is supported also in the axial direction by the outer ring 16a and the tapered rollers R and, even if the thrust load adds to the main shaft 11, this thrust load can be received by the double-row tapered roller bearing 16 and little thrust load is transmitted to the input shaft 12a of the gear-box 12.

In this way, in the power generating wind turbine 1 of the present embodiment, the main shaft 11 is supported by the single double-row tapered roller bearing 16 and hence the supporting structure of the main shaft 11 can be made compact.

Also, the radial load, thrust load and bending load so adding to the main shaft 11 can be received by the double-row tapered roller bearing 16 and hence the strength required of the gear-box 12 and the gear-box supporting members can be made smaller.

By so reducing the required strength of the gear-box 12, the gear-box 12 can be reduced in size and in weight as compared with the gear-box used in the prior art power generating wind turbine.

Also, the main shaft 11 is formed in the annular shape in which the outer diameter D1 is larger than the axial directional length L1. That is, the length L (the axial directional size) of the main shaft 11 is set shorter than in the prior art main shaft.

Thereby, the weight of the main shaft 11 can be suppressed and the bending moment adding to the main shaft 11 when the wind turbine rotating blades 5 receive the wind force becomes smaller. Thus, the strength required of the main shaft 11 and the supporting structure of the main shaft 11 can be made smaller.

By so making smaller the strength required of the main shaft 11 and the supporting structure of the main shaft 11, the main shaft 11 and the supporting structure of the main shaft 11 can be made further compact.

In this way, in the power generating wind turbine 1 of the present embodiment, the parts and components provided in or on the nacelle 3, such as the supporting structure of the main shaft 11, the gear-box 12, the gear-box supporting members, etc. can be made smaller in size and lighter in weight and hence the nacelle 3 itself can be made smaller and lighter. Also, by so reducing the size and weight of the parts and components provided in or on the nacelle 3, transportation and installation of the nacelle 3 and other parts and components can be facilitated. Further, the load adding to the tower 2 that supports these parts and components becomes smaller and the structure of the tower 2 can be simplified.

Moreover, in the power generating wind turbine 1 of the present embodiment, the main shaft 11 and the gear-box 12 are structurally separate from each other. Hence, the maintenance of the main shaft 11 and the gear-box 12 can be carried out independent from each other and this realizes a high maintainability.

For example, in case of carrying out the maintenance of the gear-box 12, while the main shaft 11 is being fitted to the nacelle 3, the gear-box 12 is separated from the main shaft 11 and the maintenance of the gear-box 12 only can be carried out. Also, in case of carrying out the maintenance of the main shaft 11, the main shaft 11 is separated from the gear-box 12 and the maintenance of the main shaft 11 only can be carried out.

Also, the main shaft 11 and the input shaft 12a of the gear-box 12 are connected together via the coupling 17 and hence the adjusting work requiring skills, such as an alignment adjustment of the main shaft 11 and the input shaft 12a or the like becomes unnecessary and the work of assembling and maintenance is facilitated.

By the coupling 17 also, transmission of the radial load, thrust load and bending load from the main shaft 11 to the gear-box 12 can be prevented and thereby the strength required of the gear-box 12 and the gear-box supporting members can be made further smaller.

Moreover, in the present embodiment, the main shaft 11 and the gear-box 12 are connected together via the coupling 17 being a gear coupling. By drawing the gear-box 12 out of the main shaft 11 so that the coupling 17 is released, the main shaft 11 and the gear-box 12 can be easily separated from each other. In this way, in the power generating wind turbine 1 of the present embodiment, the main shaft 11 and the gear-box 12 can be easily separated from each other and this realizes a high maintainability.

Here, in the present embodiment, while the example where the coupling 17 is a gear coupling has been shown, the invention is not limited thereto but a disk coupling, connecting structure by a bush, connecting structure by a pin or otherwise a coupling of an arbitrary type can be used.

Second Embodiment

Figure 4:
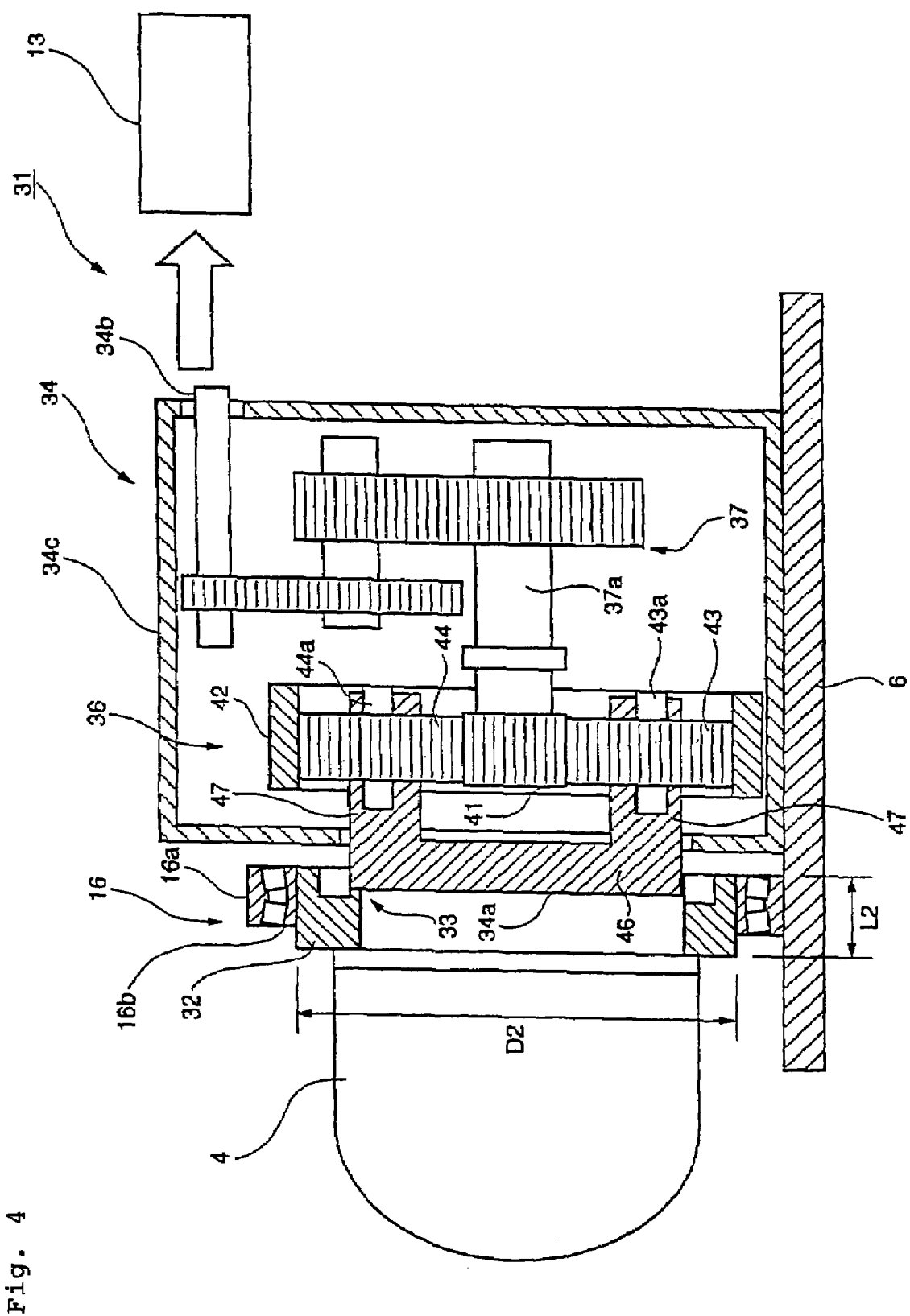
FIG. 4 is a cross sectional side view of a power generating wind turbine of a second embodiment according to the present invention.

A second embodiment according to the present invention will be described below with reference to FIG. 4. A power generating wind turbine 31 of the present embodiment, as shown in FIG. 4, is partially different from the power generating wind turbine 1 of the first embodiment. In the power generating wind turbine 31 to be described below, parts and components same or similar to those of the power generating wind turbine 1 are designated by the same reference numerals and detailed description on the already described ones will be omitted.

The power generating wind turbine 31 of the present embodiment is mainly characterized in being different from the power generating wind turbine 1 in the shape of the main shaft, supporting structure of the main shaft and construction of the gear-box.

In the power generating wind turbine 31 shown in FIG. 4, as the main shaft to which the rotor head 4 is connected, a main shaft 32 having a minor axis is employed. Concretely, the main shaft 32 is of an approximately annular shape in which an outer diameter D2 is larger than an axial directional length L2 (this may also be of an approximately disk shape).

It is to be noted that the rotor head 4 and the main shaft 32 are connected together by an arbitrary connecting structure, such as bolting or the like.

The main shaft 32 has its outer circumference received by the inner ring 16b of the double-row tapered roller bearing 16 so that the main shaft 32 is supported to the nacelle bed plate 6 via the double-row tapered roller bearing 16.

Also, the main shaft 32 has its radial directional inner side connected to an input shaft 34a of a gear-box 34 via a coupling 33. The input shaft 34a is connected coaxially with the main shaft 32 so that a rotation of the input shaft 34a around the axis relative to the main shaft 32 is regulated.

As the coupling 33, a gear coupling, for example, is used that comprises an internal gear provided on an inner circumferential surface of the main shaft 32 and an external gear provided on an outer circumferential surface of the input shaft 34a so as to mesh with the internal gear. Here, the coupling 33 is not limited to the gear coupling but a disk coupling, connecting structure by a bush, connecting structure by a pin or otherwise a coupling of an arbitrary type can be used.

The gear-box 34 speeds up the rotation inputted into the input shaft 34a from the main shaft 32 to an appropriate rotational speed to be put out to an output shaft 34b. The gear-box 34 has its portion, other than an input shaft end and an output shaft end, contained in a casing 34c.

Between the input shaft 34a and the output shaft 34b, a planetary stage 36 using planetary gears and a parallel stage 37 using spur gears, connected in series to the planetary stage 36, are provided and the speed-up is carried out in each of these stages. In the present embodiment, the gear-box 34 has the planetary stage 36 of one stage and the parallel stage 37 of two stages so that the rotation inputted from the input shaft 34a can be speeded up to an appropriate rotational speed by the speed-up of three stages.

The planetary stage 36 is of what is called a planetary type provided between the input shaft 34a and the parallel stage 37. Concretely, the planetary stage 36 comprises a sun gear 41 provided on an input shaft 37a of the parallel stage 37, an internal gear 42 of an annular shape provided coaxially with the sun gear 41 at the same position in the axial direction and planetary gears 43, 44 of a pair provided between the sun gear 41 and the internal gear 42 for meshing therewith.

The internal gear 42 is fixedly fitted to the casing 34c by a stay or the like (not shown) so that a rotation of the internal gear 42 around the axis relative to the casing 34c is regulated.

The planetary gears 43, 44 of the pair are provided at positions opposed to each other with the sun gear 42 being interposed between them and supporting shafts 43a, 44a of the planetary gears 43, 44, respectively, are supported to the input shaft 34a of the gear-box 34.

The input shaft 34a of the gear-box 34 is provided coaxially with the main shaft 32 and comprises a disk portion 46 (this may also be an annular portion) to be inserted into the radial directional inner side of the main shaft 32 and a bearing portion 47 provided projecting toward the planetary gears 43, 44 side from the disk portion 46 and supporting the supporting shafts 43a, 44a of the planetary gears 43, 44 so that their rotation around the axis is allowed.

In the power generating wind turbine 31 constructed as mentioned above, when the main shaft 32 is rotationally driven around the axis by the wind force, the input shaft 34a of the gear-box 34 connected to the main shaft 32 via the coupling 33 also is rotated around the axis together with the main shaft 32.

Then, the planetary gears 43, 44 supported by the bearing portion 47 of the input shaft 34a are rotated (revolved) around the axis of the input shaft 34a.

Also, by the input shaft 34a being rotationally driven around the axis, the planetary gears 43, 44 meshing with the fixedly fitted internal gear 42 are rotated around the supporting shafts 43a, 44a, respectively.

By the respective planetary gears 43, 44 being so rotated, the sun gear 41 meshing with the planetary gears 43, 44 is rotationally driven around the axis together with the input shaft 37a of the parallel stage 37.

In this way, the planetary stage 36 speeds up the rotation of the main shaft 32 by one stage to be transmitted to the parallel stage 37. The parallel stage 37 speeds up the rotation inputted into the input shaft 37a further by two stages to be put out to the output shaft 34b. Then, the rotation of the output shaft 34b is inputted into the generator 13 so that electricity is generated by the generator 13.

In the power generating wind turbine 31 having the above-mentioned construction, a gear-box having a construction different from the gear-box 34 may be employed.

Herebelow, construction examples of the gear-box employed other than that of the power generating wind turbine of the present embodiment will be described with reference to FIGS. 5 to 7.

Figure 5:
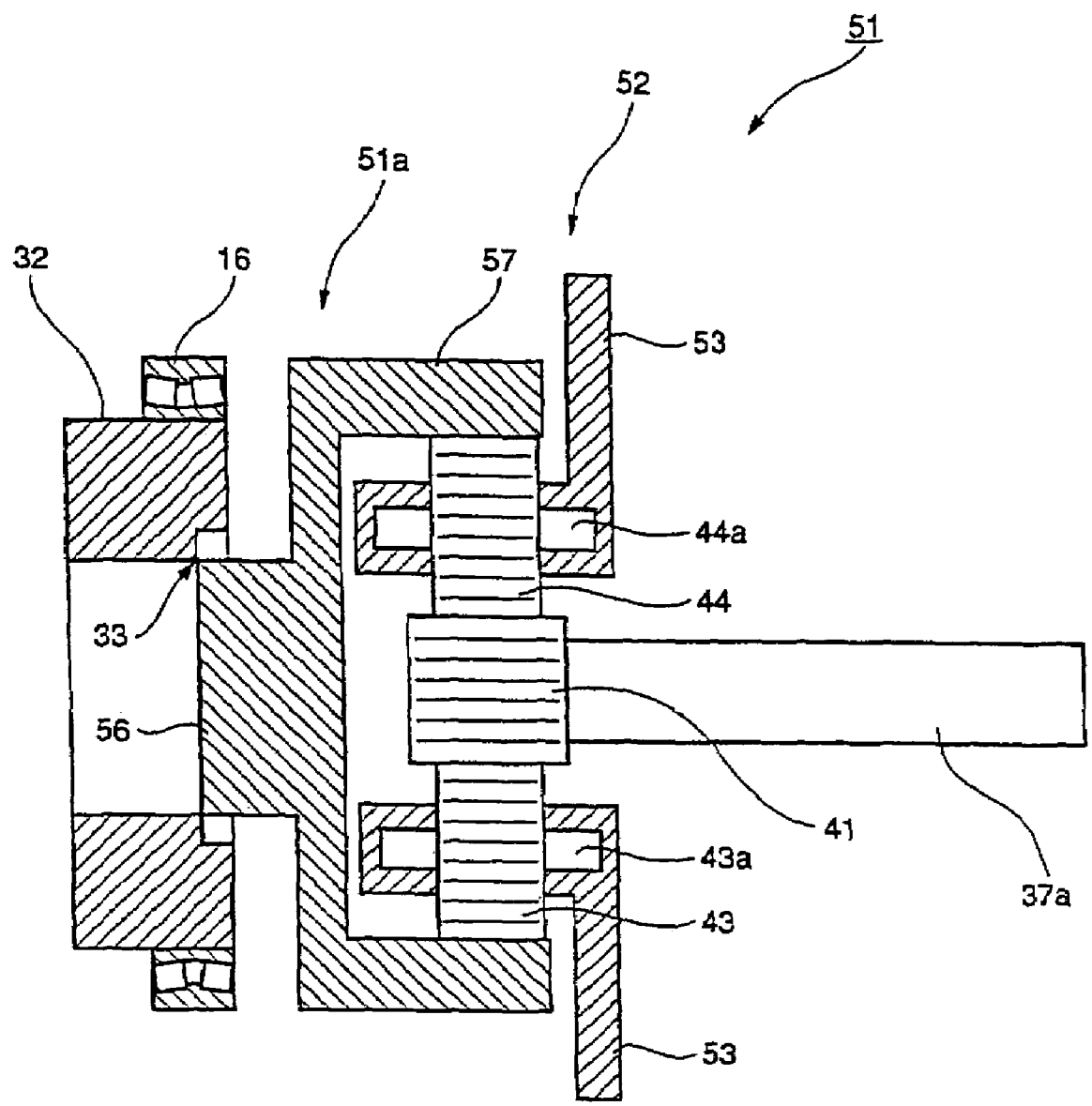
FIG. 5 is a cross sectional side view showing a modified construction of the power generating wind turbine of the second embodiment of FIG. 4.

A gear-box 51 shown in FIG. 5 (First Example) employs a planetary stage 52 of what is called a star type in place of the planetary stage 36 of the gear-box 34 shown in FIG. 4. Concretely, while, in the planetary stage 36, the supporting shafts 43a, 44a of the planetary gears 43, 44 are supported to the input shaft 34a, in the construction of the planetary stage 52, they are supported by a stay 53 connected to the casing 34c (not shown in FIG. 5).

Here, the supporting shafts 43a, 44a are supported so that their rotation (revolution) around the sun gear 41 is regulated and the planetary gears 43, 44 are supported rotatably around their axes.

Also, in the planetary stage 52, in place of providing the input shaft 34a and the internal gear 42, an input shaft 51a is provided. The input shaft 51a comprises a columnar portion 56 (this may also be a cylindrical portion) to be coaxially inserted into the radial directional inner side of the main shaft 32 and an internal gear 57 provided on the sun gear 41 side of the columnar portion 56 for meshing with the planetary gears 43, 44.

Here, the columnar portion 56 also is connected to the main shaft 32 via the coupling 33.

In the gear-box 51 constructed as mentioned above, when the main shaft 32 is rotationally driven around the axis by the wind force, the input shaft 51a of the gear-box 51 connected to the main shaft 32 via the coupling 33 also is rotated around the axis together with the main shaft 32.

Then, the respective planetary gears 43, 44 meshing with the internal gear 57 of the input shaft 51a are rotated around their axes.

By the respective planetary gears 43, 44 being so rotated, the sun gear 41 meshing with the planetary gears 43, 44 is rotationally driven around the axis together with the input shaft 37a of the parallel stage 37.

In this way, in the planetary stage 52, the rotation of the main shaft 32 is speeded up by one stage to be transmitted to the parallel stage 37.

Figure 6:
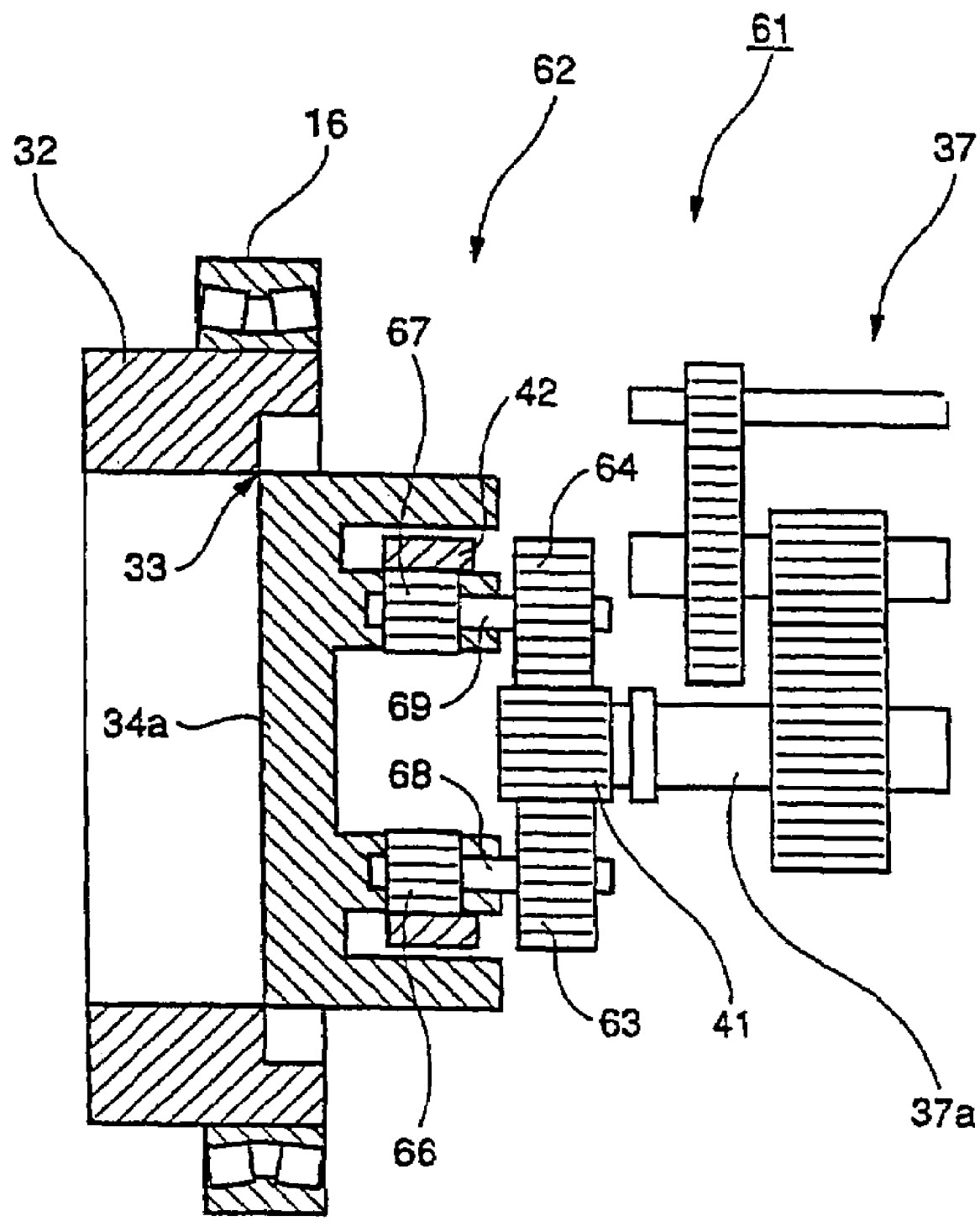
FIG. 6 is a cross sectional side view showing another modified construction of the power generating wind turbine of the second embodiment of FIG. 4.

A gear-box 61 shown in FIG. 6 (Second Example) employs a planetary stage 62 of what is called a compound planetary type in place of the planetary stage 36 of the gear-box 34 shown in FIG. 4. Concretely, in the planetary stage 62, the sun gear 41, that has meshed with the internal gear 42 in the planetary stage 36, is arranged being moved toward the parallel stage 37 side beyond the internal gear 42. And, in place of the planetary gears 43, 44, there are provided first planetary gears 63, 64 meshing with the sun gear 41 and second planetary gears 66, 67 arranged on the input shaft 34a side of these first planetary gears 63, 64 so as to mesh with the internal gear 42.

The first planetary gear 63 and the second planetary gear 66 are coaxially supported by a supporting shaft 68, that is supported to the input shaft 34a, so that their relative rotations around the axis are regulated. Likewise, the first planetary gear 64 and the second planetary gear 67 are coaxially supported by a supporting shaft 69, that is supported to the input shaft 34a, so that their relative rotation around the axis is regulated.

Here, the first planetary gear 63 and the second planetary gear 66 are rotatable around the axis together with the supporting shaft 68. Likewise, the first planetary gear 64 and the second planetary gear 67 are rotatable around the axis together with the supporting shaft 69.

In the gear-box 61, when the input shaft 34a rotates, the second planetary gears 66, 67 supported to the input shaft 34a rotate (revolve). When the second planetary gears 66, 67, meshing with the internal gear 42, so rotate, they rotate together with the supporting shafts 68, 69.

In this way, when the second planetary gears 66, 67 rotate, the first planetary gears 63, 64 connected to these second planetary gears 66, 67 via the supporting shafts 68, 69 also rotate. Thereby, the sun gear 41 meshing with these first planetary gears 63, 64 is rotationally driven and the rotation is inputted into the downstream parallel stage 37.

In the gear-box 61, the sun gear 41 and the first planetary gears 63, 64 are positioned on the parallel stage 37 side beyond the internal gear 42 and hence the size of the set of these gears is not needed to be made installable within the size of the inner diameter of the internal gear 42.

That is, in the gear-box 61, the diameter of the first planetary gears 63, 64 can be made larger than the second planetary gears 66, 67 and, between these first and second planetary gears, the speed-up of one stage can be carried out.

Thereby, in the gear-box 61, the speed-up ratio can be further enhanced as compared with the gear-box 34 shown in FIG. 4.

Figure 7:
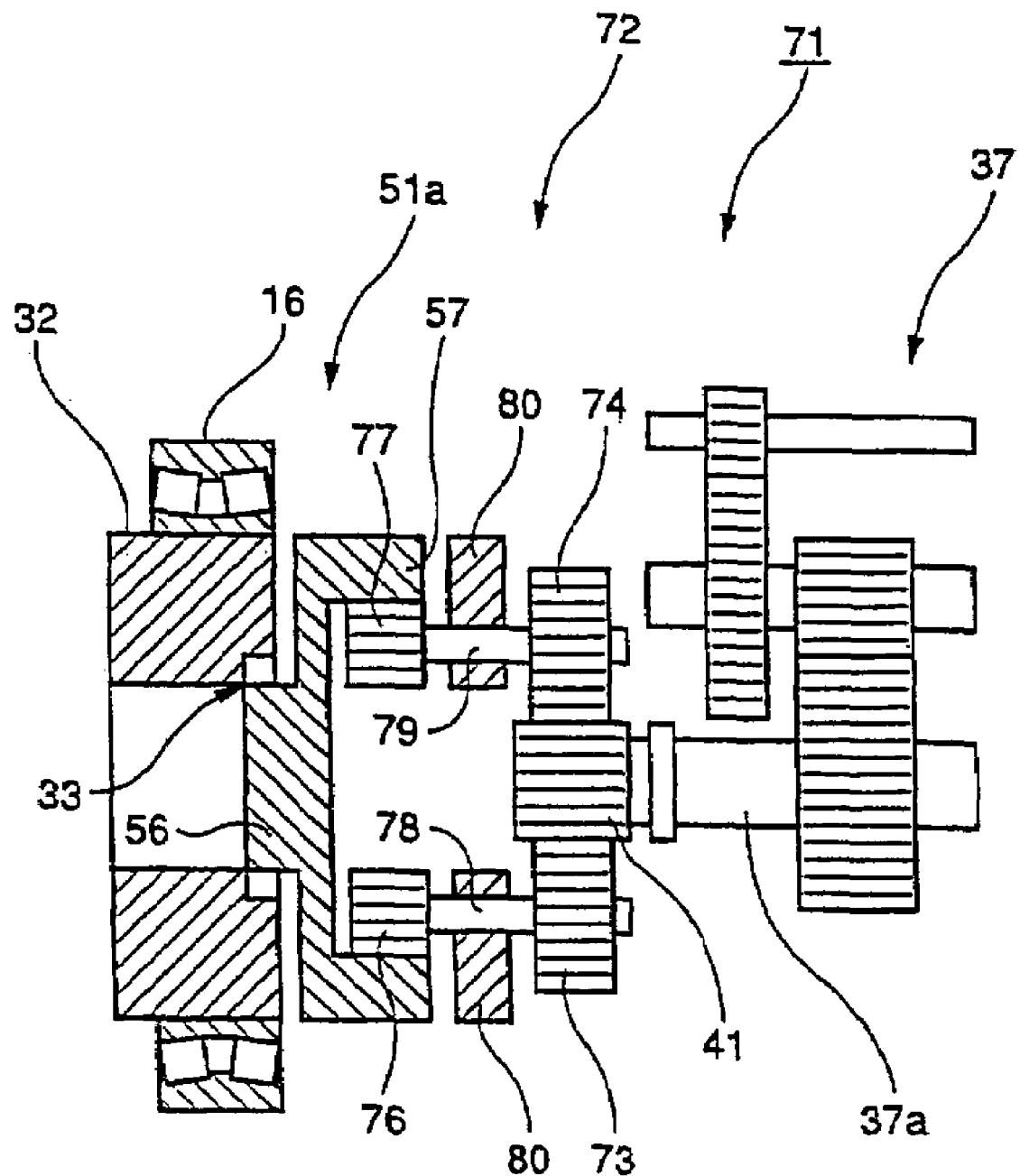
FIG. 7 is a cross sectional side view showing still another modified construction of the power generating wind turbine of the second embodiment of FIG. 4.

A gear-box 71 shown in FIG. 7 (Third Example) employs a planetary stage 72 of what is called a compound planetary type in place of the planetary stage 52 of the gear-box 51 shown in FIG. 5. Concretely, in the planetary stage 72, the sun gear 41, that has meshed with the internal gear 42 in the planetary stage 52, is arranged being moved toward the parallel stage 37 side beyond the internal gear 42. And, in place of the planetary gears 43, 44, there are provided first planetary gears 73, 74 meshing with the sun gear 41 and second planetary gears 76, 77 arranged on the input shaft 34a side of these first planetary gears 73, 74 so as to mesh with the internal gear 42.

The first planetary gear 73 and the second planetary gear 76 are provided on a supporting shaft 78, that is supported to a casing (not shown) via a stay 80 and these first planetary gear 73 and second planetary gear 76 are coaxially supported by the supporting shaft 78 so that their relative rotation around the axis is regulated. Likewise, the first planetary gear 74 and the second planetary gear 77 are provided on a supporting shaft 79, that is supported to the casing via the stay 80 and these first planetary gear 74 and the second planetary gear 77 are coaxially supported by the supporting shaft 79 so that their relative rotation around the axis is regulated.

Here, the first planetary gear 73 and the second planetary gear 76 are rotatable around the axis together with the supporting shaft 78. Likewise, the first planetary gear 74 and the second planetary gear 77 are rotatable around the axis together with the supporting shaft 79.

In the gear-box 71, when the input shaft 51a rotates, the second planetary gears 76, 77 meshing with the internal gear 57 of the input shaft 51a rotate.

By the second planetary gears 76, 77 so rotating, the first planetary gears 73, 74 connected to these second planetary gears 76, 77 via the supporting shafts 78, 79 also rotate. Thereby, the sun gear 41 meshing with these first planetary gears 73, 74 is rotationally driven and the rotation is inputted into the downstream parallel stage 37.

In this gear-box 71 also, the sun gear 41 and the first planetary gears 73, 74 are positioned on the parallel stage 37 side beyond the internal gear 42 and hence the size of the set of these gears is not needed to be made installable within the size of the inner diameter of the internal gear 42.

Thus, the diameter of the first planetary gears 73, 74 can be made larger than the second planetary gears 76, 77 and, between these first and second planetary gears, the speed-up of one stage can be carried out.

Thereby, in the gear-box 71, the speed-up ratio can be further enhanced as compared with the gear-box 51 shown in FIG. 5.

It is to be noted that the constructions of the above-described gear-boxes 51, 61, 71 are also applicable to the gear-box 12 of the power generating wind turbine 1 of the first embodiment.

Here, as the generator 13 shown in each of the above embodiments, a multipolar generator may be used.

The multipolar generator can generate a sufficient electric power, even if the rotational speed of the generator shaft of the generator 13 is low. That is, as the speed-up ratio of the gear-box can be made smaller, such a gear-box as effects a speed-up of one stage only can be used as the gear-box.

Figure 8:
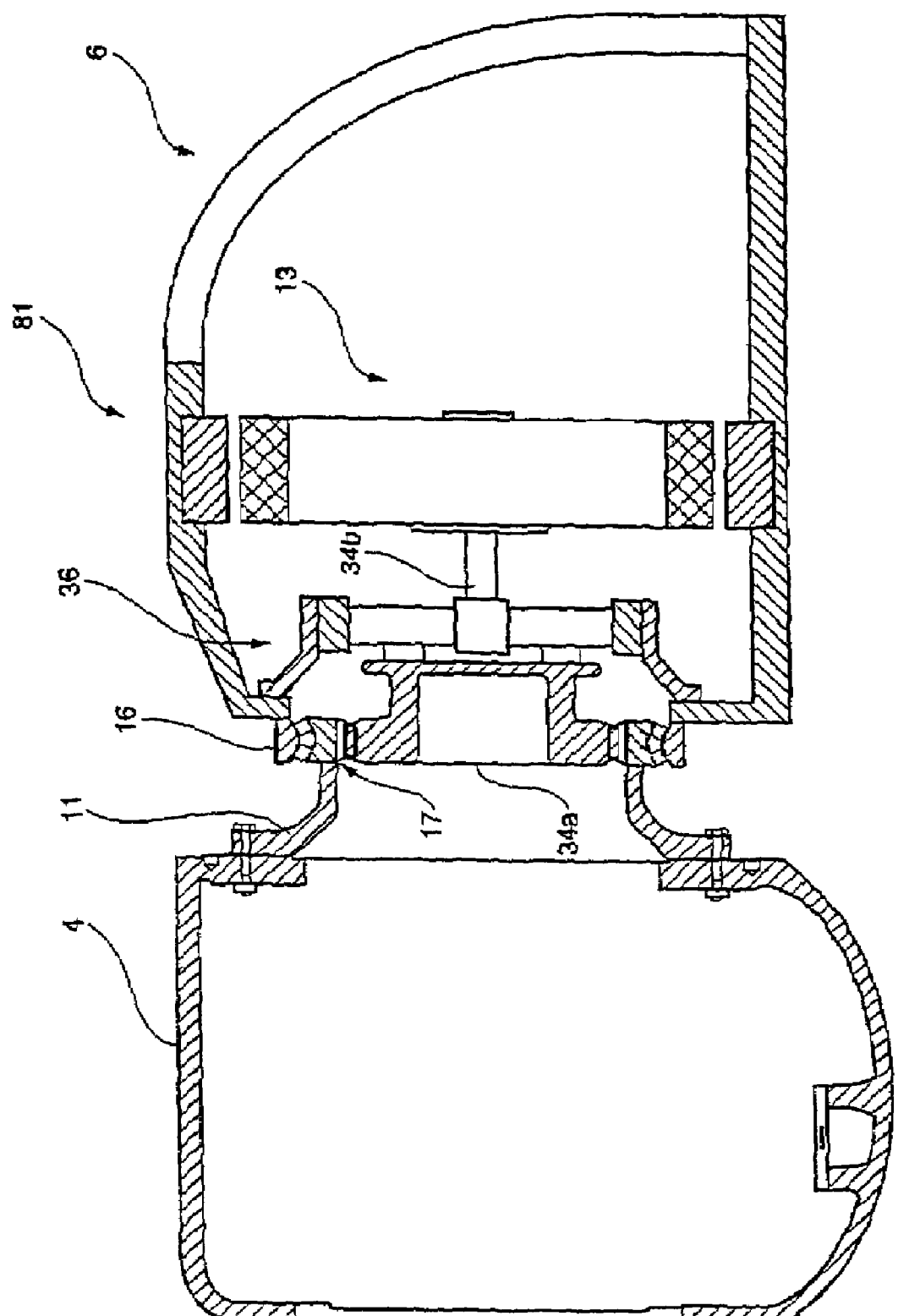
FIG. 8 is a cross sectional side view showing one modified example of the power generating wind turbine according to the present invention.

For example, as shown in FIG. 8, as the gear-box, a gear-box 81 comprising the above-mentioned planetary stage 36 only can be used. Or, as shown in FIG. 9, a gear-box 82 comprising the above-mentioned planetary stage 52 only can be used.

It is to be noted that, in the generator, the greater the number of poles, the further the lower limit of the rotational speed of the generator shaft at which electricity can be stably generated can be reduced. Hence, it is preferable to use a generator having poles of eight or more.

Figure 9:
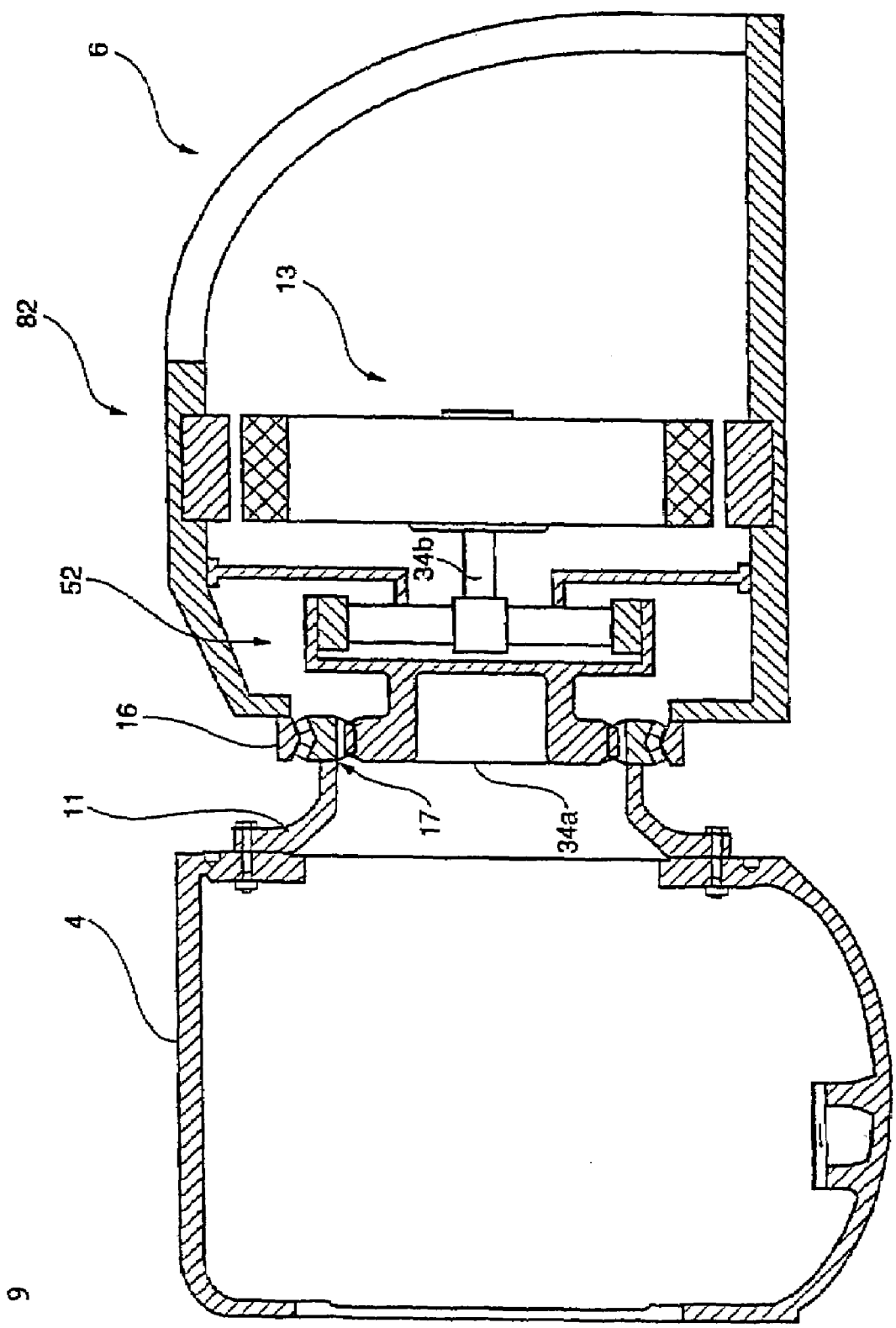
FIG. 9 is a cross sectional side view showing one modified example of the power generating wind turbine according to the present invention.

Also, in the schematic views of FIGS. 8 and 9, while examples where a gear-box carrier and a generator stator are directly assembled onto the nacelle bed plate 6 are shown, a casing of the gear-box 81 or 82 or a casing of the generator 13 may be assembled onto the nacelle bed plate 6.

Such a gear-box performing a speed-up of one stage only can be made extraordinarily small in size and light in weight as compared with the prior art gear-box performing the speed-up of multiple stages. Also, such a gear-box uses less number of gears and hence the reliability becomes high and troublesome maintenances can be largely saved. Also, noise of the gear-box is small and this gives less influence on the surrounding environment.

Here, in a synchronous type generator, there is a need to adjust the output to an appropriate level by inputting all the generated power into a power converting apparatus and hence a comparatively large type power converting apparatus is needed to be installed on the nacelle 3. Contrary to this, in an induction type generator (for example, a double-fed type or a rotor current control type), the conversion is carried out by inputting only the secondary side output into an inverter and the nacelle 3 may be provided with a small type inverter. For this reason, by using the induction type generator, the space on the nacelle 3 can be efficiently used as compared with the case of using the synchronous type generator.

Figure 10:
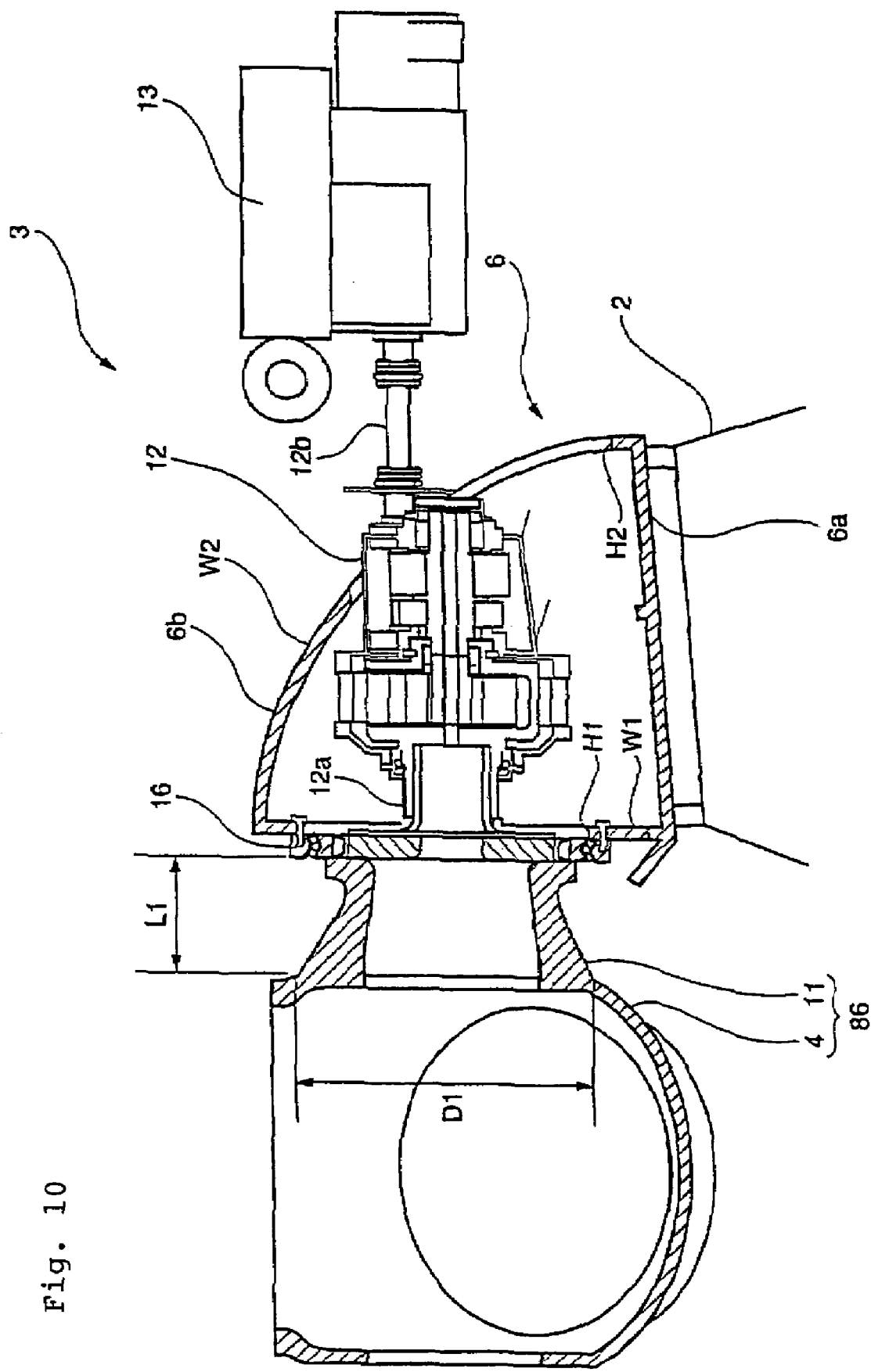
FIG. 10 is a cross sectional side view showing one modified example of the power generating wind turbine according to the present invention.

Also, in each of the above-described embodiments, while examples where the main shaft and the rotor head are separate members from each other are shown, the invention is not limited thereto but, for example, a combined member 86 in which the main shaft 11 and the rotor head 4 are integrated together, as shown in FIG. 10, may be used. Such combined member 86 can be manufactured by casting, for example.

In this construction, assembling work to assemble together the rotor head and the main shaft becomes unnecessary and man-hour to assemble the power generating wind turbine can be reduced. Also, a fitting flange of the main shaft becomes unnecessary and a weight alleviation of the entire device can be realized as compared with the case where the main shaft and the rotor head are separated from each other.

Figure 11:
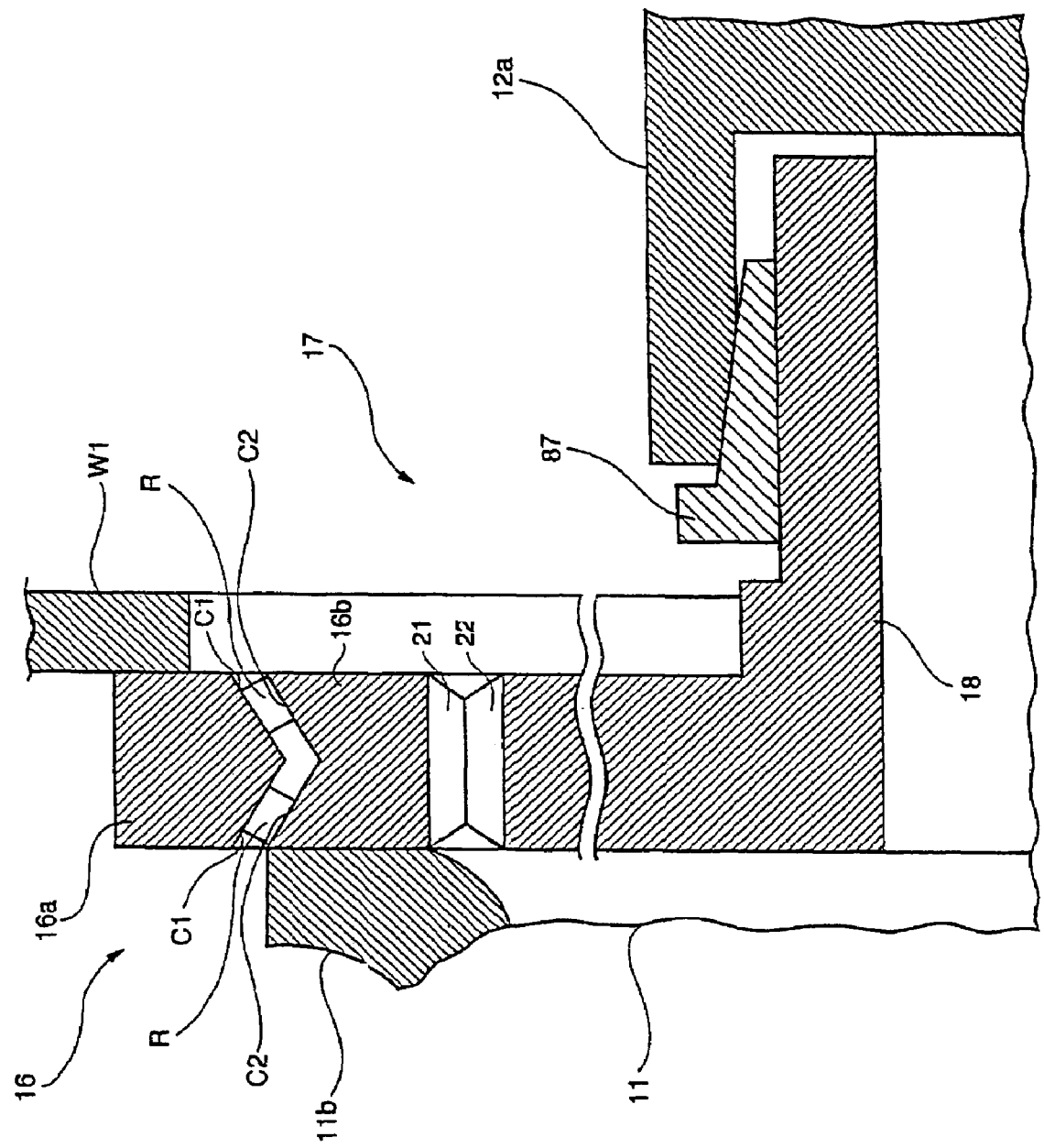
FIG. 11 is a cross sectional side view showing one modified example of the power generating wind turbine according to the present invention.

Also, in each of the above-described embodiments, while examples where the coupling is used as the connecting structure of the main shaft and the input shaft of the gear-box are shown, the invention is not limited thereto but, for example, a connecting structure shown in FIG. 11 may be used.

That is, in the connecting structure of FIG. 11, the second external gear 23 arranged on the inner tube 18 and the second internal gear 24 arranged on the input shaft 12, both provided in the first embodiment, are eliminated and instead a tapered ring member 87 is inserted along the axial direction by using a bolt or hydraulic pressure around an outer circumferential surface of an area where the second external gear 23 has been arranged. This tapered ring member 87, when seen on a cross section taken on the axis, is formed in a wedge shape in which an outer diameter is gradually contracted toward the input shaft 12a side.

In the present connecting structure, the tapered ring member 87 provided around the outer circumferential surface of the inner tube 18 is forcibly inserted under the inner surface of the input shaft 12a and thereby a large friction force is generated by a surface pressure between the tapered ring member 87 and the input shaft 12a. Thus, by this friction force, the rotation transmitted from the main shaft 11 to the inner tube 18 is further transmitted to the input shaft 12a via the tapered ring member 87.

Third Embodiment

Next, a third embodiment according to the present invention will be described with reference to FIG. 12.

Figure 12:
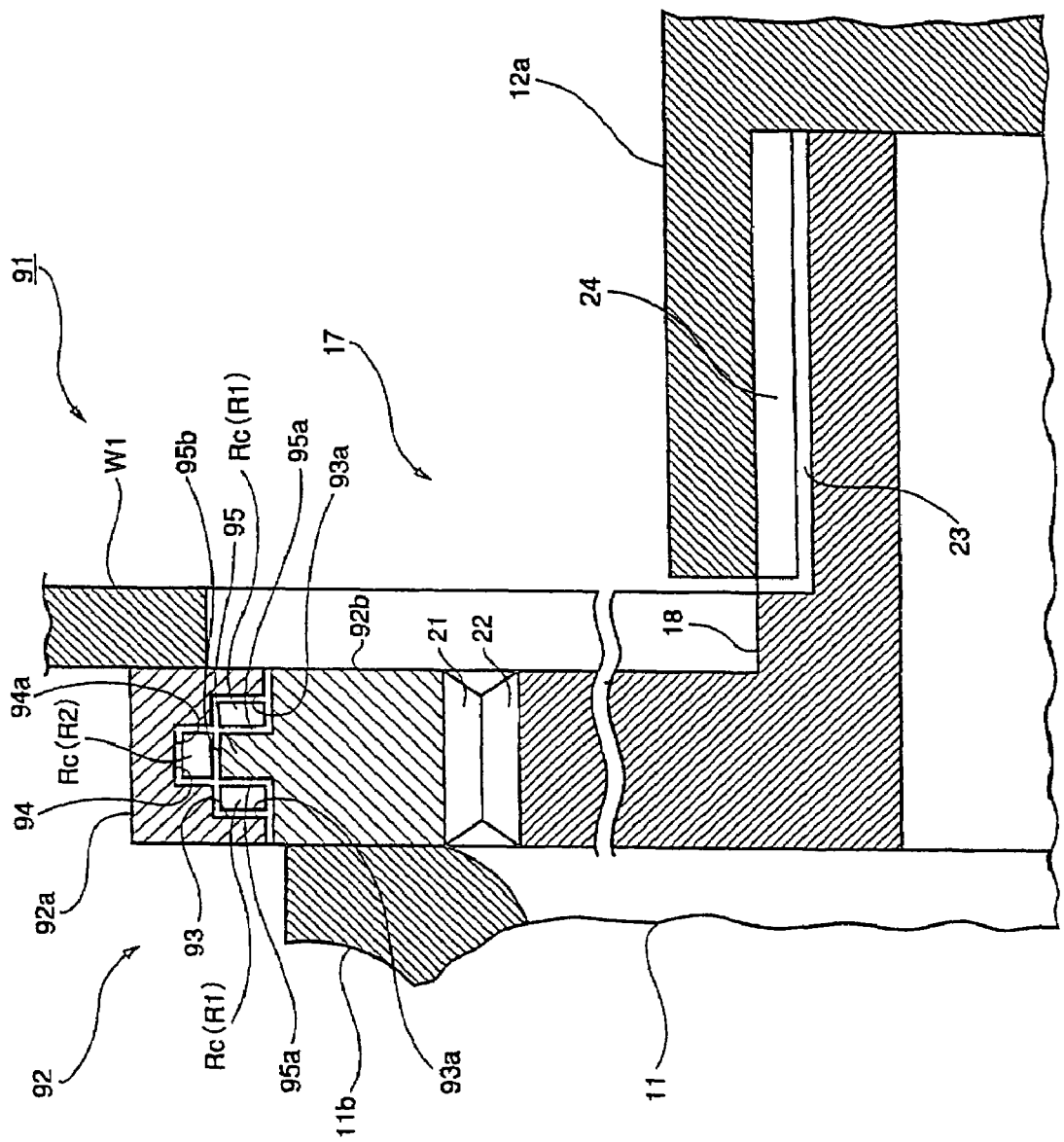
FIG. 12 is a cross sectional side view of a power generating wind turbine of a third embodiment according to the present invention.

A power generating wind turbine 91 of the present embodiment, as shown in FIG. 12, is partially different from the power generating wind turbine 1 of the first embodiment. In the power generating wind turbine 91 to be described below, parts and components same or similar to those of the power generating wind turbine 1 are designated by the same reference numerals and detailed description on the already described ones will be omitted.

The power generating wind turbine 91 of the present embodiment is mainly characterized in being different from the power generating wind turbine 1 in the supporting structure of the main shaft. Concretely, in the power generating wind turbine 91, as the supporting structure supporting the main shaft 11, in place of the double-row tapered roller bearing 16, such a structure is employed that the main shaft 11 is supported to the nacelle 3 via a single three-row roller bearing 92 that comprises a row of rollers receiving the radial load and a pair of rows of rollers receiving the thrust load.

The three-row roller bearing 92 is provided coaxially with the main shaft 11 between an axial directional one end of the main shaft 11 and the wall portion W1 so as to support the main shaft 11 rotatably around its axis. That is, the main shaft 11 is supported to the wall portion W1 via the three-row roller bearing 92.

The three-row roller bearing 92 comprises an outer ring 92a, that is connected to the wall portion W1 by bolting or the like, and an inner ring 92b, that is coaxially provided on the radial directional inner side of the outer ring to be connected to the main shaft 11 by bolting or the like.

Between these outer ring 92a and inner ring 92b, a plurality of rolling elements are provided along the circumferential direction. As the rolling elements, cylindrical rollers Rc are used. Herebelow, in the three-row roller bearing 92, the cylindrical rollers Rc arranged along the circumferential direction at the same position in the axial direction will be referred to as a row of the rollers Rc. This row of the rollers Rc is provided in three rows along the axial direction.

As further details of the construction of the three-row roller bearing 92, in an inner circumferential surface of the outer ring 92a, a first groove 93 is provided along the entire circumferential direction. This first groove 93, when seen on a cross section taken on the axis, has a rectangular shape extending in the radial direction. Also, in a bottom surface of the first groove 93, a second groove 94 is provided along the entire circumferential direction. This second groove, when seen on a cross section taken on the axis, has a rectangular shape extending in the radial direction and having a width smaller than the first groove 93.

The first groove 93 has its side wall 93a formed in a plane that is coaxial with the outer ring 92a and substantially orthogonal to the axis of the outer ring 92a. Also, the second groove 94 has its bottom surface 94a formed in a cylindrical surface that is coaxial with the outer ring 92a.

In an area opposed to the first groove 93a of an outer circumferential surface of the inner ring 92b, a projection 95 is provided along the entire circumferential direction. This projection 95, when seen on a cross section taken on the axis, has a rectangular shape extending in the radial direction and is positioned within the first groove 93a formed in the outer ring 92a.

The projection 95 has its side wall 95a formed in a plane that is substantially orthogonal to the axis of the inner ring 92b and its outer circumferential surface 95b formed in a cylindrical surface that is coaxial with the inner ring 92b.

That is, both of the side wall 93a of the first groove 93 and the side wall 95a of the projection 95 have planes parallel with each other and both of the bottom surface 94a of the second groove 94 and the outer circumferential surface 95b of the projection 95 have cylindrical surfaces parallel to each other.

Between these side wall 93a and side wall 95a, a plurality of cylindrical rollers Rc are provided. These cylindrical rollers Rc are provided having their respective axes arranged along the radial direction of the three-row roller bearing 92. The row so formed by these cylindrical rollers Rc will be called a first row of rollers R1.

Also, between the bottom surface 94a and the outer circumferential surface 95b, a plurality of cylindrical rollers Rc are provided. These cylindrical rollers Rc are provided having their respective axes arranged substantially in parallel with the axis of the three-row roller bearing 92. The row so formed by the cylindrical rollers Rc will be called a second row of rollers R2.

In the power generating wind turbine 91 constructed as mentioned above, the load adding to the main shaft 11 is received by the wall portion W1 via the three-row roller bearing 92 that supports the main shaft 11 and little load except the rotational torque is transmitted to the input shaft 12a of the gear-box 12.

Next, a function of the three-row roller bearing 92 will be concretely described.

Both axial directional side surfaces of the projection 95 of the inner ring 92b to which the main shaft 11 is fitted are supported to the outer ring 92a via the two first rows of rollers R1. For this reason, when the thrust load adds to the main shaft 11, this thrust load is received by the outer ring 92a, while a rotation of the inner ring 92b relative to the outer ring 92a is being allowed.

Also, the first rows of rollers R1 are provided on both sides of the projection 95 so that the projection 95 is supported from both sides in the axial direction to the outer ring 92a. Hence, even if the bending load adds to the main shaft 11, this bending load is received by the outer ring 92a, while a rotation of the inner ring 92b relative to the outer ring 92a is being allowed.

Also, between the outer circumferential surface 95b of the projection 95 on the inner ring 92b and the bottom surface 94a of the second groove 94 provided in the outer ring 92a, the second row of rollers R2 is provided. Thus, the outer circumferential surface of the inner ring 92b is supported to the outer ring 92a via the second row of rollers R2. Hence, when the radial load adds to the main shaft 11, this radial load is received by the outer ring 92a, while a rotation of the inner ring 92b relative to the outer ring 92a is being allowed.

As the outer ring 92a is fitted to the wall portion W1 of the nacelle 3, the thrust load, bending load and radial load transmitted from the main shaft 11 to the inner ring 92b are received by the wall portion W1 via the three-row roller bearing 92.

In this way, in the power generating wind turbine 91 of the present embodiment, the main shaft 11 is supported by the single three-row roller bearing 92 and hence the supporting structure of the main shaft 11 can be made compact.

Also, the radial load, thrust load and bending load adding to the main shaft 11 are received by the three-row roller bearing 92 and hence the strength required of the gear-box 12 and the supporting members thereof can be made lower.

By so reducing the required strength of the gear-box 12, a gear-box which is smaller in size and lighter in weight can be used for the gear-box 12, as compared with that used in the prior art power generating wind turbine.

It is to be noted that, while the present embodiment has been described with respect to the example where the power generating wind turbine 91 is applied to the first embodiment, the power generating wind turbine 91 may be applied to the construction of the power generating wind turbine of the second embodiment or the constructions of the modification examples of the first and second embodiments.

The invention claimed is:

1. A power generating wind turbine comprising:
   a nacelle supported by a tower;
   a main shaft connected to a wind turbine rotating blade at a front side of a wall portion of said nacelle;
   a generator housed within said nacelle; and
   a gear-box for increasing a rotational speed of an output shaft of said gearbox to drive said generator, said gear-box being housed within said nacelle,
   wherein said main shaft is connected to an input shaft of said gear-box, and said main shaft is supported by said wall portion of said nacelle via a single double-row tapered roller bearing provided coaxially with said main shaft, said single double-row tapered roller bearing being positioned at the front side of said wall portion and at an axial end portion of said main shaft.

2. A power generating wind turbine according to claim 1, wherein said main shaft has an annular or disk shape and an outer diameter of said main shaft is larger than an axial directional length of said main shaft.

3. A power generating wind turbine according to claim 2, wherein said main shaft and said input shaft of said gear-box are connected to each other via a coupling.

4. A power generating wind turbine according to claim 1, wherein said main shaft and said input shaft of said gear-box are connected to each other via a coupling.

5. A power generating wind turbine comprising:
   a nacelle supported by a tower;
   a main shaft connected to a wind turbine rotating blade at a front side of a wall portion of said nacelle;
   a generator housed within said nacelle; and
   a gear-box for increasing a rotational speed of an output shaft of said gearbox to drive said generator, said gear-box being housed within said nacelle,
   wherein said main shaft is connected to an input shaft of said gear-box, and said main shaft is supported by said wall portion of said nacelle via a single three-row roller bearing provided coaxially with said main shaft, said single three-row roller bearing having a first row of rollers for receiving a radial load and second and third rows of rollers for receiving a thrust load, said single three-row roller bearing being positioned at the front side of said wall portion and at an axial end portion of said main shaft.

6. A power generating wind turbine according to claim 5, wherein said main shaft has an annular or disk shape and an outer diameter of said main shaft is larger than an axial directional length of said main shaft.

7. A power generating wind turbine according to claim 6, wherein said main shaft and said input shaft of said gear-box are connected to each other via a coupling.

8. A power generating wind turbine according to claim 5, wherein said main shaft and said input shaft of said gear-box are connected to each other via a coupling.

* * * * *